(No Model.)

S. L. HUNTER.
FLOWER POT.

No. 352,247. Patented Nov. 9, 1886.

WITNESSES:

INVENTOR:
S. L. Hunter
BY Munn & Co.
ATTORNEYS.

UNITED STATES PATENT OFFICE.

SARAH L. HUNTER, OF LITTLE ROCK, ARKANSAS.

FLOWER-POT.

SPECIFICATION forming part of Letters Patent No. 352,247, dated November 9, 1886.

Application filed August 23, 1886. Serial No. 211,663. (No model.)

*To all whom it may concern:*

Be it known that I, SARAH L. HUNTER, of Little Rock, in the county of Pulaski and State of Arkansas, have invented a new and Improved Flower-Pot, of which the following is a full, clear, and exact description.

My invention relates to pots for holding flowers or plants set in earth, and has for its object to provide an inexpensive pot of this character which will supply the plants with necessary moisture and allow their safe transportation for long distances.

The invention consists in certain novel features of construction and combinations of parts of the flower-pot, all as hereinafter fully described and claimed.

Reference is to be had to the accompanying drawings, forming a part of this specification, in which similar letters of reference indicate corresponding parts in both the figures.

Figure 1:
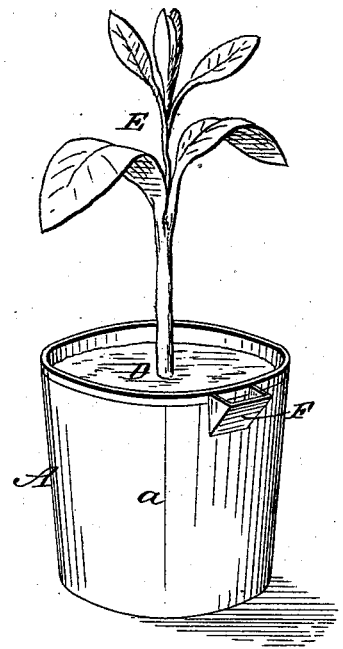
Figure 2:
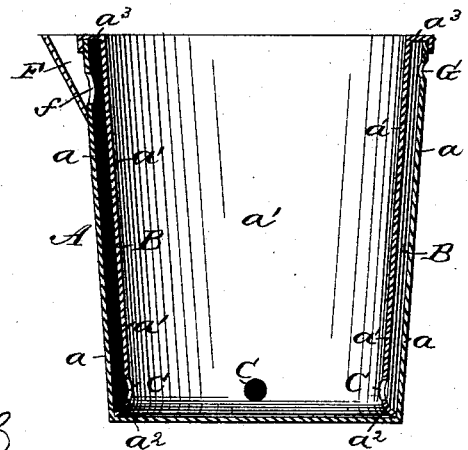

Figure 1 is a side elevation of one of my improved flower-pots with a plant set therein, and Fig. 2 is a vertical sectional elevation of the flower-pot drawn to a larger scale.

The flower-pot A is made, preferably, in round form and tapering slightly toward the bottom, and with an outer wall, $a$, and an inner wall, $a'$, which is joined to the outer wall at or near its lower or bottom edge, and whereby a space is provided between the walls $a$ $a'$, forming a water-reservoir, B. A series of holes, C, are made in the inner wall, $a'$, of the pot near the bottom of the reservoir B, and through these holes C water may flow from the reservoir into the inside of the pot, to moisten the earth D therein and promote the growth of plants, as at E, set in the pot. A nose or spout, F, is fixed to the side of the outer wall, $a$, and communicates by a hole, $f$, with the water-reservoir B, thus allowing the reservoir to be filled or emptied, as occasion requires. An air-vent hole, G, is preferably provided in the outer wall, $a$, of the pot, near the top of the reservoir, to facilitate the charging of the reservoir with water.

The flower-pot shown is made of sheet metal, the inner wall, $a'$, having an outturned bottom flange, $a^2$, which fits water-tight to the inside of the outer wall, $a$, and said wall $a'$ also has a top flange, $a^3$, turned outward and then downward at the outer face of the outer wall, $a$, where it may be fastened water-tight, or practically so, by soldering, or in any other approved way. It will be understood, however, that the flower-pot may be made in any required size of terra-cotta or clay, or of other grades of earthenware, or of any other suitable material.

By using flower-pots made as above described, and which supply water from the reservoir B through the holes C to the earth D at the bottom of the pot, plants set in the pots will send down deep roots in the earth to seek the moisture, and the plants will not be so liable to send out roots quite near the surface of the earth in the pots, as is the case with plants set in pots which have no lower water-inlet and are supplied with water by pouring it on top of the packed or hardened earth; hence plants set in my improved pots will be stronger and hardier, and will have better color, and will not be so liable to wilt. Furthermore, plants set in my improved pots may be transported safely long distances by railroad or otherwise, as the reservoir B will hold a water-supply sufficient for quite a long time, so that the plants will not be so liable to suffer by neglect of attendants to water them, which is quite an advantage to florists and reduces very largely the percentage of loss or damage of fine flowers or plants in transit.

When plants set in my improved pots are to be shipped, the spout F and hole $f$, and it may be, also, the vent-hole G, will be stopped or plugged up after the reservoir B is filled with water, to prevent splashing of the water from the reservoir through the spout and vent by the jolting of the car or other conveyance, as will readily be understood.

I am aware that flower-pots have been formed with a surrounding water-space communicating with the bottom of the pot by lateral apertures, and I do not claim the same, broadly, as of my invention.

Having thus described my invention, what I claim as new, and desire to secure by Letters Patent, is—

A flower-pot formed of the outer sheet-metal vessel, $a$, having a spout, F, and apertures $f$ and G near its upper edge, and the inner smaller vessel, $a'$, flared outwardly at its lower end, and there secured to the inner surface of the outer vessel, and the outward and downward bent flange $a^3$ around the upper edge of said inner vessel, overlapping and secured to the upper edge of the outer vessel, the lower part of the inner vessel having apertures C, communicating with the water-space B, formed between the said vessels, substantially as set forth.

SARAH L. HUNTER.

Witnesses:
 D. H. POPE,
 R. A. OSBORNE.